US010308260B2

(12) United States Patent
Fleck et al.

(10) Patent No.: US 10,308,260 B2
(45) Date of Patent: Jun. 4, 2019

(54) METHOD FOR TESTING THE FUNCTION OF A DRIVER ASSISTANCE SYSTEM AND CONTROL UNIT AND REFERENCE DEVICE FOR A DRIVER ASSISTANCE SYSTEM

(71) Applicants: SmartSurv Vision Systems GmbH, Sindelfingen (DE); Benjamin May, Lübs (DE)

(72) Inventors: Sven Fleck, Sindelfingen (DE); Benjamin May, Lübs (DE)

(73) Assignees: SMARTSURV VISION SYSTEMS GMBH, Sindelfingen (DE); BENJAMIN MAY, Lübs (DE)

( * ) Notice: Subject to any disclaimer, the term of this patent is extended or adjusted under 35 U.S.C. 154(b) by 0 days.

(21) Appl. No.: 15/705,258

(22) Filed: Sep. 14, 2017

(65) Prior Publication Data

US 2018/0079425 A1 Mar. 22, 2018

(30) Foreign Application Priority Data

Sep. 22, 2016 (DE) ........................ 10 2016 218 277

(51) Int. Cl.
*B60W 50/02* (2012.01)
*B60W 50/04* (2006.01)
(Continued)

(52) U.S. Cl.
CPC ...... *B60W 50/0205* (2013.01); *B60W 50/045* (2013.01); *G05D 1/0061* (2013.01);
(Continued)

(58) Field of Classification Search
CPC ........... B60W 50/0205; B60W 50/045; B60W 50/14; B60W 30/08; G01M 99/00
(Continued)

(56) References Cited

U.S. PATENT DOCUMENTS 5,408,411 A * 4/1995 Nakamura ......... B60G 17/0182 701/48
7,333,922 B2 2/2008 Cannon
(Continued)

FOREIGN PATENT DOCUMENTS

DE 10 2005 005 720 A1 8/2006
DE 10 2006 007 752 A1 12/2006
(Continued)

*Primary Examiner* — Tan Q Nguyen
(74) *Attorney, Agent, or Firm* — Hackler Daghighian Martino & Novak

(57) ABSTRACT

A method for testing the function of a driver assistance system of a vehicle, wherein an environment of the vehicle is detected by means of a sensor system, includes the following steps: stimulating the driver assistance system by means of an external stimulation; processing the stimulation in the driver assistance system so that a stimulation response is obtained; transmitting the stimulation and/or information relating to the stimulation to an external reference device and determining a reference response for the stimulation in the external reference device in accordance with a desired state of the driver assistance system; and comparing the stimulation response with the reference response. The invention enables the functionality of a driver assistance system of a vehicle to be tested in a simple and cost-effective manner.

20 Claims, 6 Drawing Sheets

Vehicle 60
Driver assistance system 10
External stimulation 14
Determining 16 the stimulation response
Stimulation response 18
Working 74?
Repair 76?
Switch off/over 78?
71
73
Stimulation production 68
Detection 70 of information
Receiving 72 the stimulation
Determining 26 the reference response
Reference response 24
Comparison 28b
Reference device 20
Control unit 58

(51) Int. Cl.
*G05D 1/00* (2006.01)
*G01M 99/00* (2011.01)
*B60W 50/14* (2012.01)

(52) U.S. Cl.
CPC ....... *B60W 50/14* (2013.01); *B60W 2050/021* (2013.01); *B60W 2050/046* (2013.01)

(58) Field of Classification Search
USPC ........................................................ 701/29.2
See application file for complete search history.

(56) References Cited

U.S. PATENT DOCUMENTS

| | | | | |
|---|---|---|---|---|
| 9,459,180 | B2 | 10/2016 | Breu et al. | |
| 9,764,689 | B2 * | 9/2017 | Burke | G01S 13/931 |
| 2003/0060936 | A1 * | 3/2003 | Yamamura | B60K 26/021<br>701/1 |
| 2015/0314783 | A1 * | 11/2015 | Nespolo | B60W 30/0953<br>701/301 |
| 2016/0232070 | A1 | 8/2016 | Schwarz et al. | |

FOREIGN PATENT DOCUMENTS

| | | | |
|---|---|---|---|
| DE | 10 2006 043 317 | A1 | 3/2008 |
| DE | 10 2012 004 650 | A1 | 9/2013 |
| DE | 10 2015 202 326 | A1 | 8/2016 |

* cited by examiner

METHOD FOR TESTING THE FUNCTION OF A DRIVER ASSISTANCE SYSTEM AND CONTROL UNIT AND REFERENCE DEVICE FOR A DRIVER ASSISTANCE SYSTEM

CROSS-REFERENCE TO RELATED APPLICATIONS

This application claims priority to the German application number 10 2016 218 277.3 filed on Sep. 22, 2016, the entire contents of which are fully incorporated herein with this reference.

DESCRIPTION

Field of the Invention

The invention relates to a method for testing the function of a driver assistance system of a vehicle, wherein an environment of the vehicle is detected by means of a sensor system. The invention further relates to a control unit for a driver assistance system of a vehicle, for testing the function of the driver assistance system and a reference device for a driver assistance system of a vehicle, for testing the function of the driver assistance system.

Background of the Invention

Driver assistance systems are used to ease the burden on a driver of a vehicle and to increase the active travel safety. Some driver assistance systems enable partially autonomous or autonomous movement of the vehicle. Examples of driver assistance systems in the field of road vehicles are adaptive cruise control, lane-keeping assistant and lane changing assistants, park assist systems, brake assist systems, systems for identifying traffic signs and the like.

Generally, before such driver assistance systems are used in series production vehicles, the functionality thereof is established with reference to sample systems which have been selected by way of example ("Approval"). Depending on the type of driver assistance system, when the driver assistance system is installed in a vehicle, a one-off calibration may additionally be carried out. A regular function test during the service-life, as is conventional with other safety-relevant systems, such as brake installations, is in contrast typically not carried out. Instead, it is generally assumed that the driver assistance system will remain functional for the duration of use of the vehicle.

As a result of the effects of ageing or other, in particular mechanical, damage, however, the driver assistance system may over time no longer function or no longer function as specified. For example, the clouding of lenses or the presence of scratches on windows may lead to camera systems losing their original capability. Even (micro) electronic circuits may be subjected to the effects of ageing. This may lead to damage to persons and to material damage, in particular if a vehicle driver is reliant on the (usual) functionality of the driver assistance system.

In the field of rail technology or aircraft, it is known to use error-tolerant control systems in which a plurality, often two to four, identical control devices are provided independently of each other in the vehicle. The functionality of the error-tolerant control system can be considered to be given as long as a plurality, often at least two, of the control devices provide the same result, for instance in the form of a control intervention which is intended to be carried out. However, the provision of redundant control devices is linked with, sometimes considerable, additional costs and requires additional installation space.

SUMMARY OF THE INVENTION

An object of the present invention is therefore to provide a method by means of which the functionality of a driver assistance system of a vehicle can be tested in a simple and cost-effective manner.

This object is achieved according to the invention by a method for testing the function of a driver assistance system of a vehicle, wherein an environment of the vehicle is detected by means of a sensor system, having the steps of:

a) stimulating the driver assistance system by means of an external stimulation;

b) processing the stimulation in the driver assistance system so that a stimulation response is obtained;

c) transmitting the stimulation and/or information relating to the stimulation to an external reference device and determining a reference response for the stimulation in the external reference device in accordance with a desired state of the driver assistance system; and d) comparing the stimulation response with the reference response.

With the method according to the invention, the functionality of the driver assistance system during the duration of use thereof can be tested in a simple manner. According to the invention, it is made possible for malfunctions of the driver assistance system to be identified in a technical manner; that is to say, the recognition of the malfunction is not left to a driver of the vehicle. In particular, malfunctions can be identified before they become evident as a failure or a practically relevant functional limitation of the driver assistance system.

The reference device provides for comparison purposes the reference response ("ground truth") which corresponds to the response of a fully functional driver assistance system or a part-system of the driver assistance system (desired state). Typically, the reference device calculates the reference response from the transmitted stimulation or the transmitted information relating to the stimulation. The reference device is constructed as a device which is independent of the vehicle, preferably as an external device or as a software implementation, for example, in a cloud platform or on a central server. Cost savings are thereby achieved since the reference device does not have to be separately provided and operated for each vehicle. A reference device may instead be used for testing the function of the driver assistance systems of a large number of vehicles. For the individual vehicle itself, as a result of the invention there is no or only little additional expenditure.

The reference device is provided externally, that is to say, independently of the driver assistance system and outside the vehicle. The reference device is thereby prevented from being subjected to the same environmental and ageing influences as the driver assistance system. Preferably, ageing of the reference device is prevented by suitable measures or the reference device is replaced at suitable intervals. An external reference device is also protected from manipulations, for instance, via an on-board system of the vehicle. Depending on the type of the driver assistance system which is intended to be tested, the reference device can be used for vehicles of different manufacturers, for example, in systems for traffic sign recognition. There is then also protection against selectively incorrect programming of the reference device by a vehicle manufacturer. Preferably, the reference device is configured by means of a cloud server.

If only a finite number of different external stimulations are taken into consideration for stimulation of the driver assistance system or are intended to be used for testing the function of the driver assistance system, the reference responses for these external stimulations can be calculated in advance and stored in the reference device. The reference device then determines the reference response by selecting the relevant reference response for a specific stimulation. The influences of ageing in the reference device can thereby be eliminated.

Using the comparison of the stimulation response and reference response, it is possible to draw conclusions relating to the state, in particular ageing state, of the driver assistance system. In the context of the stimulation response and reference response, functional parameters of the driver assistance system can be determined in a quantitative manner, for example, the image sharpness of a camera or the identification probability of traffic signs. By forming a differential of the values of the functional parameter(s) of the stimulation response and reference response, a quantitative statement can be made relating to the state of the driver assistance system; an established differential may, for example, be compared with threshold values in order to initiate warning notifications or a switching-off of the driver assistance system.

Ageing effects which can be readily tested by means of the invention include, for example, lens clouding or changing of filter properties and/or coatings of optical components (for example, of infrared blocking filters, anti-reflective coatings or a Bayer filter of an image sensor), in particular as a result of UV radiation, scratches of a camera lens or a window portion located in front of a camera, failure of electrical circuit components and/or storage errors, in particular cable breakages or malfunction of semi-conductor circuit elements, or also mechanical loosening and consequently change of the orientation of components of the sensor system. It is also possible to detect a degradation of sharpness and/or change of an intrinsic/extrinsic calibration as a result of mechanical component changes over the service-life of components (for example, objectives, lens elements, housings, lens holders, adhesive connections, camera shutters). Effects of environmental influences (such as temperature fluctuations, air humidity and other climatic influences) on the behaviour of the driver assistance system can also be detected according to the invention. Changes of the system behaviour with self-teaching systems (for instance, Deep Learning-based methods) can also be detected according to the invention).

The stimulation may in particular be a manifestation (appearance) of the environment of the sensor system (for example, with a traffic sign, a road marking or another vehicle) which is detected (observed) by the sensor system, or also an electrical signal produced by the sensor system, or another intermediate signal which is further processed in the driver assistance system. Alternatively, the stimulation may also be supplied artificially to the driver assistance system, for example, by a control unit for the driver assistance system. In this instance, a specific environment can be simulated, or a defined intermediate signal can be supplied to the driver assistance system. This enables the use of stimulations which are critical for the driver assistance system ("salient stimuli").

The stimulation may involve a plurality of individual stimuli which stimulate the driver assistance system in chronological order and/or at the same time. Accordingly, the stimulation response may comprise a plurality of part-responses. The stimulation response may comprise a reaction to the stimulation (for instance, drive instructions) from the driver assistance system. The stimulation response may alternatively or additionally contain characteristic values and/or intermediate values which are established from the stimulation by the driver assistance system. Preferably, in the context of the method according to the invention, a plurality of different stimulations and/or stimulation groups are processed one after the other; in particular a testing cycle which is intended to be carried out may be configured and processed.

The sensor system for detecting the environment typically comprises one or more cameras, in particular for visible light or infrared light, or also radar, LIDAR, Time-of-Flight or ultrasound sensors. The sensor system may further also detect vehicle data, for example, transverse and/or longitudinal accelerations, yaw rates, steering angles or data relating to interventions of the vehicle driver.

The vehicle with the driver assistance system may be a land, airborne or water-borne vehicle. Preferably, the vehicle is a motor vehicle, in particular a passenger vehicle, a lorry or a motorcycle. The vehicle may also be a ship or an aircraft.

The driver assistance system typically takes on parts of the driving tasks of the vehicle driver, including the detection of environmental information relevant to the vehicle driving; preferably, the driver assistance system enables driverless driving. The driver assistance system may in particular be a preferably adaptive cruise control, a lane-keeping assistant and/or lane changing assistant, a park assist system, a brake assist system, a system for identifying traffic signs and/or traffic lights, a system for blind spot monitoring, a congestion assistant or a combination of a plurality of these systems. The driver assistance system may also be a forward orientated driver assistance system, for instance an augmented video/augmented reality system or a system for traffic light detection, an environment monitoring system (in particular for coupled vehicles, such as trailers), a night vision system (FIR, NIR, active gated sensing). Driver assistance systems for interior monitoring, in particular driver monitoring systems, may also be tested according to the invention. Furthermore, automated drive systems within all levels in accordance with SAE J3016 and VDA and driver assistance systems for safety-relevant functions which are specified within the NCAP standardisation can be tested using the method according to the invention.

Preferably, a repeated function testing is carried out, for instance in the context of a regular workshop inspection or main examination of the vehicle or after every journey of the vehicle. The function testing may advantageously also be carried out whilst the vehicle is travelling, in particular continuously.

In a preferred variant of the method according to the invention, there is provision in step a) for the stimulation to be an electrical signal which is produced by the sensor system, in step c) for the electrical signal produced to be transmitted to the reference device and in the reference device for the reference response to be calculated from the electrical signal. In this manner, a function testing for the processing and evaluation steps of the driver assistance system can be carried out. An electrical signal can be further transmitted to the reference device in a particularly simple manner.

In an alternative advantageous variant, there is provision in step a) for the stimulation to be the manifestation of the environment of the sensor system, in step c) for information relating to the position and/or orientation of the sensor system to be transmitted to the external reference device, and in step c) for the reference device to determine from stimulation responses transmitted from the driver assistance systems of other vehicles a reference response with respect to this position and/or this orientation of the sensor system thereof. The sensor system of the driver assistance system can thereby also be tested. The reference device may be constructed in the manner of a database. In particular, different types of driver assistance systems (for instance, from different manufacturers or different variants of driver assistance systems of the same manufacturer) with the same basic functionality (for example, traffic sign recognition) can also be tested. The stimulation responses transmitted from the driver assistance systems of other vehicles were typically previously archived in the reference device; that is to say, used to form a database (all of the stimulation responses transmitted and associated position and orientation information). The evaluation can be carried out relative to the statistical distribution of the stimulation responses of the other driver assistance systems ("anomaly detection") and may in a preferred embodiment also refer to environmental conditions (such as time, brightness and weather conditions). The manifestation of the environment may be an artificial target or a projection (also into the sensor system) or a natural environment. The position of the sensor system corresponds in particular to the location of the vehicle with the driver assistance system on a road; the orientation of the sensor system typically corresponds to a travel direction on this road. Preferably, in addition to the stimulation or information relating to the stimulation, the stimulation response is also transmitted from the driver assistance system to the reference device. The stimulation response can then be used to expand the database of the reference device, wherein a result of the comparison from step c) can be taken into account.

There is preferably provision for the method to be used at least also whilst the vehicle is travelling. A continuous function testing can thereby be configured. Malfunctions can be detected immediately after they have occurred.

A variant is also advantageous in which the method is at least also executed during a workshop inspection of the vehicle. Regular monitoring of the driver assistance system can thereby be ensured. The reference device may be stored in the workshop for the vehicle types which are generally presented there. The data transmission from the vehicle to the reference device is also thereby simplified. Additional cost advantages can thereby be achieved.

A preferred variant makes provision for the method also to be carried out at least after the vehicle has been parked after a journey. This enables function testing at short time intervals. For example, a WLAN connection can be used to transmit larger quantities of data. The driver assistance system can to this end independently connect itself to a WLAN at a parking location of the vehicle. The stimulation or the information relating to the stimulation and the stimulation response were preferably buffered beforehand in the vehicle, for instance in the driver assistance system or a control unit. Preferably, the function testing is carried out by means of a plurality of buffered stimuli and/or information relating to stimuli and a plurality of associated stimulation responses. Alternatively or additionally, a control unit arranged in the vehicle may introduce an artificially produced stimulation into the driver assistance system after the journey in order establish the stimulation response to this stimulation.

A variant is particularly preferred which is characterised in that in a step e) the driver assistance system is at least partially switched off and/or switched over into a safe state if from the comparison pursuant to step d) a malfunction, in particular a safety-relevant malfunction, of the driver assistance system is established. A malfunctioning driver assistance system is thereby prevented from being operated in a dangerous manner. Preferably, a vehicle driver is notified by a notification signal (optical and/or acoustic) regarding the determined malfunction of the driver assistance system and the at least partial switching-off and/or the switching over to the safe state.

In an advantageous development of this variant, there is provision for a malfunction to be identified by the stimulation response being located outside absolute tolerances with respect to the reference response. If the absolute tolerances are exceeded, it should be assumed that the driver assistance system is no longer functioning correctly. The dangerous operation of such a driver assistance system with a malfunction present can consequently be prevented. Absolute tolerances may, for example, be exceeded when a traffic sign which has been recognised by a large number of other vehicles and which is considered to be verified by geolocation/registration has not been recognised. Advantageously, an absolute tolerance can be set out as a permissible proportion of non-identified traffic signs from a plurality of traffic signs which have been identified by other vehicles. Advantageously, depending on environmental conditions (such as brightness, weather), differently sized absolute tolerances can be used.

An advantageous development makes provision for an imminent malfunction to be identified by the stimulation response being located outside age-related permissible tolerances with respect to the reference response, even when the stimulation response is still located within the absolute tolerances and by a warning notification being output when an imminent malfunction is identified. Age-related permissible tolerances can be determined in advance or can be derived from a statistical evaluation of the stimulation responses of driver assistance systems of a comparable age. It can consequently be determined that, although a driver assistance system is still functional, a malfunction is indicated by deviations which are not ageing-appropriate. The driver assistance system can then be repaired or replaced before a critical malfunction occurs. The age-related permissible tolerances can typically change with the age, the period of operation and/or the driving performance of the vehicle.

Alternatively or additionally, an imminent malfunction can be identified by the stimulation response being located outside of prospective tolerances with respect to the reference response, even if the stimulation response is still located within the absolute tolerances, and by a warning notification being output when an imminent malfunction is identified. The prospective tolerances being exceeded indicates that the behaviour of the driver assistance system has moved considerably from the desired state thereof. It can consequently be determined that, although a driver assistance system is still functional, a malfunction will soon occur as the deviation further increases. The driver assistance system can then be repaired or replaced before a critical malfunction occurs. The prospective tolerances are typically determined so as to be invariable over time. This variant is particularly suitable for driver assistance systems which are known to be subjected to ageing which may make replacement necessary but in which the rate of ageing or the beginning of ageing is unknown or differs significantly between individuals.

Alternatively or additionally, an imminent malfunction can be identified by a time gradient of a deviation of stimulation responses for identical stimulations from the associated reference responses exceeding a limit value of a change rate, even when the stimulation responses are still within the absolute tolerances, and by a warning notification being output when an imminent malfunction is identified. The time gradient of the deviation of the stimulation responses from the associated reference responses acts as an indicator for a degradation rate of the driver assistance system. An increasing (accelerating) drift of the driver assistance system can thereby be identified. In order to determine the time gradient, stimulations of similar kind are considered so that the determined deviations of the stimulation responses from the reference responses can be compared in a quantitative manner. The deviations which are determined in this instance may be archived (stored). For example, a development of a recognition quota of traffic signs can be evaluated over time. In order to determine the gradient of the deviations, the driver assistance system may advantageously be repeatedly stimulated at time intervals with the same stimulation. The gradient is typically determined over a period of weeks or months (in accordance with a few hundred or thousand kilometers of travel distance).

A particularly preferred variant of the method according to the invention is characterised in that in step c) a wireless communication connection is used between the driver assistance system and the reference device, in particular a mobile communications and/or internet connection. This enables particularly simple transmission of the stimulation or the information relating to the stimulation, in particular also whilst the vehicle is travelling. Generally, a wireless communication between a control unit for the driver assistance system in the vehicle and the reference device outside the vehicle is preferred, for instance also for transmitting information/instructions from the reference device to the control unit.

Control Units According to the Invention

The scope of the present invention also includes a control unit for a driver assistance system of a vehicle, for testing the function of the driver assistance system, wherein the control unit comprises:

means for detecting an external stimulation and/or information relating to an external stimulation, which stimulates the driver assistance system;

means for detecting a stimulation response of the driver assistance system to the external stimulation;

means for transmitting the external stimulation and/or the information relating to the external stimulation to an external reference device; and means for the at least partial switching-off and/or switching-over to a safe state of the driver assistance system if a malfunction, in particular a safety-relevant malfunction, of the driver assistance system is present. The control unit is preferably used in a method according to the invention for testing the function of a driver assistance system. The control unit according to the invention simplifies carrying out the method according to the invention. In particular, the vehicle-side functions of the method according to the invention can be combined in the control unit. The control unit is usually carried on the vehicle but is independent in terms of its function of the driver assistance system. By use of the control unit, a defective driver assistance system can at least be partially switched off or transferred (switched over) to a safe state so that a dangerous operating state of the defective driver assistance system can be prevented. The control unit is preferably a control device, in particular a control device which is separate from the driver assistance system, or a control module, in particular an isolated item of software in a control device of the driver assistance system. The isolated software is configured independently of the software for controlling the driver assistance system. The control unit may also have means for producing the external stimulation, for instance by means of optical projection or by means of electrical stimulation of the driver assistance system.

An advantageous embodiment of the control device according to the invention is characterised in that the control unit further comprises:

means for detecting a reference response which is transmitted from the external reference device; and means for comparing the stimulation response with the reference response. As a result of the comparison of the stimulation response with the reference response in the control unit, the reference device can be configured in a particularly simple manner. The control unit may then be used as a central entity for carrying out the method according to the invention. Alternatively, the comparison may also take place in the reference device.

Reference Devices According to the Invention

The present invention also relates to a reference device for a driver assistance system of a vehicle for testing the function of the driver assistance system, wherein the reference device comprises:

means for receiving an external stimulation and/or information relating to an external stimulation which stimulates the driver assistance system from a control unit for the driver assistance system; and means for determining a reference response to the stimulation, in accordance with a desired state of the driver assistance system. The reference device according to the invention simplifies carrying out the method according to the invention and is preferably used in a method according to the invention for testing the function of a driver assistance system. The reference device is generally separate from the vehicle and is not also carried on the vehicle. The reference device is in most cases configured centrally for a large number of vehicles with driver assistance systems which are intended to be tested. The reference device is independent of the driver assistance system and of the control unit in terms of its function. The reference device simulates a correctly functioning complete driver assistance system or a part-system thereof. The reference response determined in the reference device corresponds to a desired state of the driver assistance system, that is to say, the stimulation response which a fully functioning driver assistance system would provide. The reference device generally does not have to comply with the latency requirements of the driver assistance system, that is to say, it can operate more slowly than the driver assistance system. When the reference response is determined in the reference device, therefore, additional tests can be carried out in order to determine the reference response in a particularly reliable manner. Redundant calculations of the reference response or intermediate results can be carried out, in particular wherein different calculation methods are used or different components of the reference device are used. The reference device is constructed as a device which is independent of the vehicle, preferably as an external device or as a software implementation, in particular in a cloud platform or on a central server. The reference device may contain a component which corresponds to the driver assistance system or a part-system thereof, in particular by the component being constructed in a structurally identical manner thereto. It can thereby be ensured that the reference response corresponds to a desired state of the driver assistance system. Alternatively, the reference device may contain a simulation, in particular a software simulation (virtualisation), of the driver assistance system or a part-system thereof. The reference device can thereby be constructed in a particularly cost-effective manner. Furthermore, in this manner, a plurality of different driver assistance systems can be implemented within a reference device, whereby additional cost advantages can be achieved. The reference device can also store reference responses for different external stimuli in the manner of a database or establish them from data which have been stored. Preferably, the data transmitted by the driver assistance systems which are intended to be tested are used to expand the database.

A preferred embodiment of the reference device according to the invention is characterised in that the reference device further comprises means for transmitting the reference response to the control unit. The comparison between the reference response and the stimulation response can then be carried out in the control unit. This enables a simpler configuration of the reference unit and a centralisation of the implementation of the method according to the invention in the control unit.

In an alternative embodiment, there is provision for the reference device to further comprise:

means for receiving a stimulation response of the driver assistance system from the control unit;

means for comparing the stimulation response with the reference response; and means for transmitting the comparison result or switch-off and/or switch-over instructions for the driver assistance system to the control unit. The comparison between the reference response and the stimulation response is consequently carried out in the reference device. In this instance, the control unit can be constructed in a particularly simple manner.

Other advantages of the invention will be appreciated from the description and the drawings. The features which are mentioned above and those set out in greater detail below can also be used individually per se or together in any combination. The embodiments shown and described are not intended to be understood to be a definitive listing but are instead of an exemplary nature to describe the invention.

BRIEF DESCRIPTION OF THE DRAWINGS

The invention is illustrated in the drawings and is explained in greater detail with reference to embodiments. In the drawings.

DETAILED DESCRIPTION OF THE PREFERRED EMBODIMENTS

Figure 1:
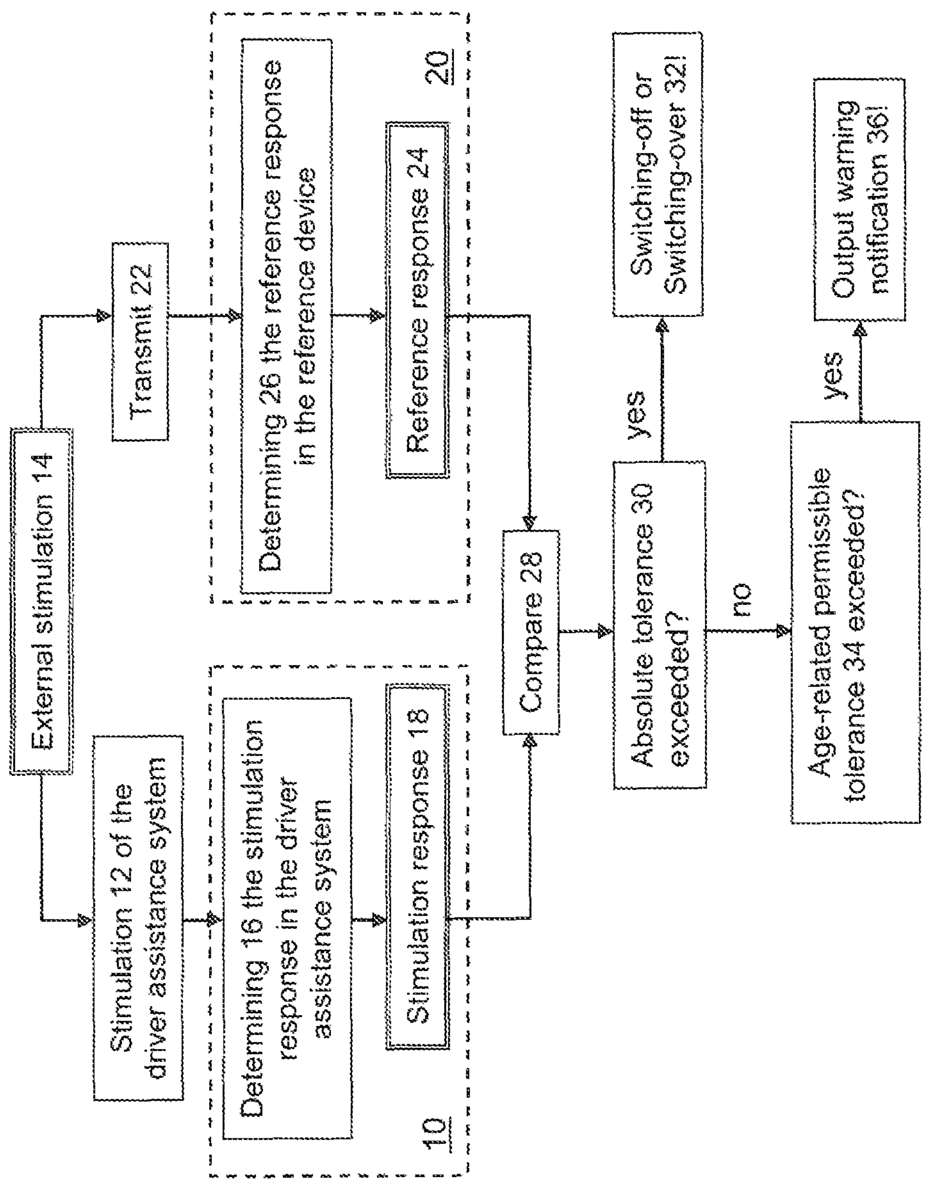
FIG. 1 shows a schematic flow chart of a first variant of the method according to the invention for testing the function of a driver assistance system.

FIG. 1 shows a schematic flow chart of a first variant of the method according to the invention for testing the function of a driver assistance system 10. In a step 12, an external stimulation 14 is used in order to stimulate the driver assistance system 10. In a subsequent step 16, the stimulation 14 is processed in the driver assistance system 10 in order to determine a stimulation response 18.

Independently of the processing of the stimulation 14 in the driver assistance system 10, the stimulation 14 is transmitted 22 to a reference device 20. The transmission 22 can be carried out in a wireless manner, for example, via mobile communications or WLAN. In the reference device 20, a reference response 24 is determined 26 from the stimulation 14.

It should be noted that the processing 16 of the stimulation in the driver assistance system 10 in order to obtain the stimulation response 18 and the processing 26 of the stimulation 14 in the reference device 20 can be carried out according to the invention both simultaneously and asynchronously. A simultaneous or substantially simultaneous (that is to say, with a short time offset, for example, a maximum of 10 seconds) processing is advantageous when the function testing is intended to be carried out using the driver assistance system 10 whilst a vehicle is travelling. An asynchronous processing is particularly suitable for a function testing following a journey of the vehicle or during a workshop inspection. During the function testing following a journey (after the vehicle has been parked), the determination 26 of the reference response 24 is typically carried out after the determination 16 of the stimulation response. During a workshop inspection, the reference response 24 may already be determined 26 before the stimulation response 18 is established by the driver assistance system 10. In particular during stimulation 12 of the driver assistance system 10 with a predetermined stimulation 14, the reference response 24 for this stimulation 14 may have been determined once in advance and stored. When the reference response 24 is determined 26, the stored reference response 24 to the stimulation 14 then only has to be read in the reference device 20.

The reference response 18 and the reference response 24 are then compared 28. The comparison 28 may in this instance be carried out, for example, in the reference device 20 (cf. FIG. 4) or in a control unit (cf. FIG. 3). With reference to the comparison result, it is checked whether the stimulation response 18 has a deviation with respect to the reference response 24 which exceeds absolute tolerances 30. If this is the case, a malfunction of the driver assistance system 10 has been identified. The driver assistance system 10 is subsequently (depending on the type of driver assistance system 10 and where applicable depending on the type of malfunction) at least partially switched off and/or switched over (transferred) 32 to a safe state. Danger to persons or goods as a result of the malfunctioning driver assistance system 10 is thereby prevented.

If the absolute tolerances 30 are complied with, it can additionally be checked whether the deviation between the stimulation response 18 and the reference response 24 exceeds age-related permissible tolerances 34. Ageing may result in a slowly increasing impairment of the functionality of the driver assistance system 10 without this already exhibiting a dangerous malfunction. The age-related tolerances 34 to be permitted are preferably determined with reference to a statistical evaluation of stimulation responses of other driver assistance systems which have been subjected to similar ageing influences, that is to say, which are, for example, approximately of the same age or which in a vehicle have had similar service-lives or driving performances. Exceeding the age-related permissible tolerances 34 indicates that the driver assistance system 10 functions (significantly) worse than would be anticipated under the conditions. It can be concluded from this that a malfunction, in particular a safety-critical malfunction, of the driver assistance system is imminent. A warning notification is therefore output 36. This may be carried out as an optical and/or acoustic indication to a vehicle driver. Alternatively or additionally, an entry may be made into an error memory of the vehicle with the driver assistance system 10. The output 36 of the warning notification can warn the vehicle driver to take particular care when using the driver assistance system 10 and encourage him to have the driver assistance system 10 repaired or exchanged.

Figure 2:
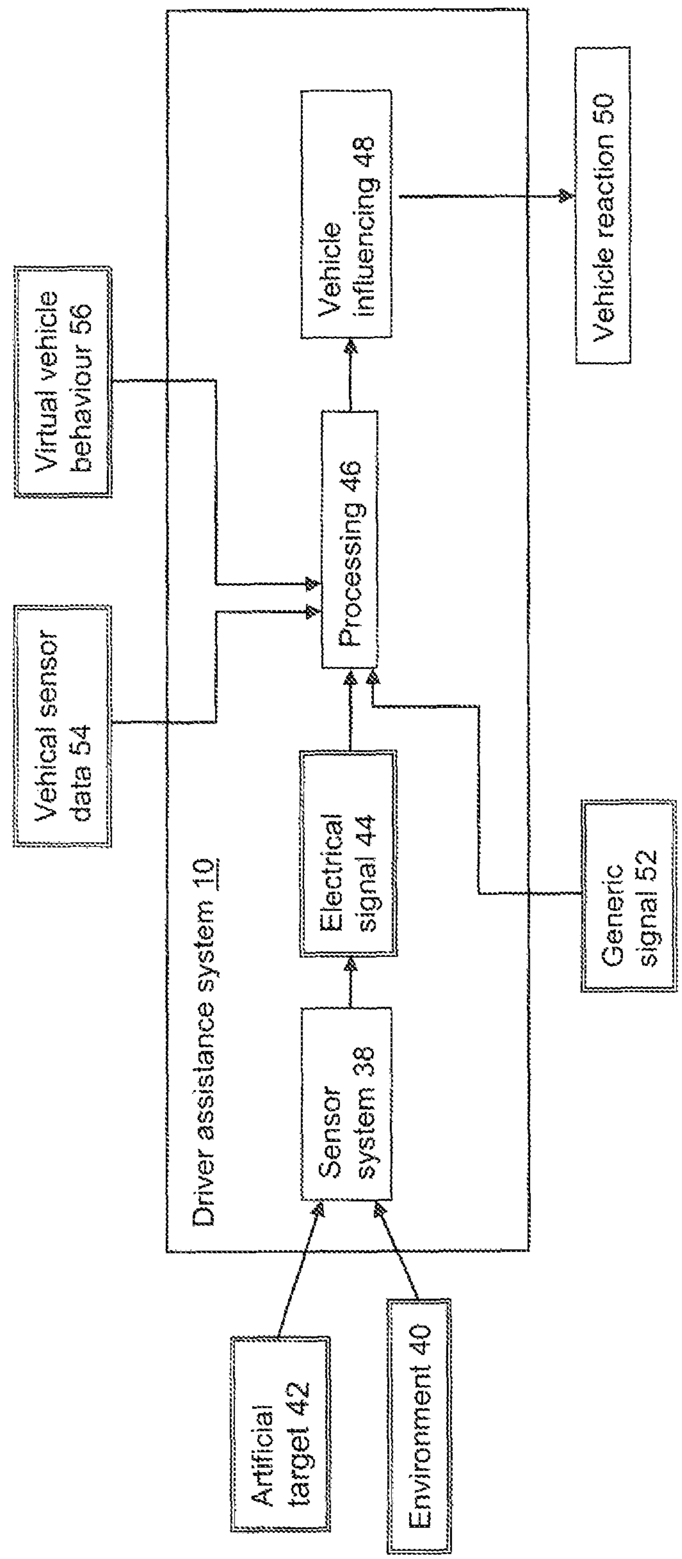
FIG. 2 is a schematic illustration of the stimulation of the driver assistance system using different types of external stimulations.

FIG. 2 schematically illustrates how a driver assistance system 10 can be stimulated using different types of external stimulations. The different external stimulations are illustrated in FIG. 2 for depiction in a state surrounded with double lines (in the other Figures, double lines are not reserved for external stimulations). For the method according to the invention, at least one external stimulation is required; however, a plurality of external stimulations can be used simultaneously or also one after the other.

The driver assistance system 10 comprises a sensor system 38 for detecting an environment 40 of a vehicle (not illustrated) with the driver assistance system 10. The environment 40 or the manifestation (appearance) thereof represents an external stimulation for the driver assistance system 10. The sensor system 38 may, for example, comprise cameras, ultrasound, radar and/or LIDAR sensors. The environment 40 may contain traffic-specific objects such as, for example, a road, a road marking, a traffic sign and/or other road users. The environment 40 may also comprise non-specific objects, such as delimitation posts, walls, fences, animals or bushes and trees.

In place of the normal environment 40 of the vehicle, the sensor system 38 may also detect an artificial target 42 as the stimulation. The artificial target 42 may be a test object (for example, a chequered face) by means of which specific functions of the sensor system are tested in an abstract manner; however, in most cases the artificial target 42 serves to simulate a predetermined driving situation for the driver assistance system 10. The artificial target 42 may, for example, be a projection of a test object or a traffic situation on a screen. Alternatively or additionally, a projection may also be carried out directly into a camera of the sensor system 38. The artificial target 42 may in particular replicate a traffic sign. Preferably, the artificial target is selected or configured in such a manner that potential malfunctions of the driver assistance system 10 and in particular the sensor system 38 thereof become evident in a particularly clear manner.

In the sensor system 38, the stimulation produced by the environment 40 or the artificial target 42 is processed so that an electrical signal 44 is obtained. The electrical signal 44 also represents a stimulation for the driver assistance system 10. The electrical signal 44 is processed 46 in the driver assistance system 10 in order to influence 48 the vehicle in an appropriate manner so that a (desired) vehicle reaction 50 is obtained.

In place of or in addition to the electrical signal 44, a generic signal 52 can be supplied to the processing 46 in the driver assistance system 10. The generic signal 52 may correspond to an electrical signal of the sensor system 38, in particular the signal which would produce a fully functional sensor system when a specific environment is detected.

Typically, the driver assistance system 10 also receives external stimulations in the form of vehicle sensor data 54 which are also processed 46 in order to influence 48 the vehicle. The vehicle sensor data 54 can be replaced or supplemented by data relating to a virtual vehicle behaviour 56 in order to test the function of the driver assistance system 10

According to the invention, all the above-mentioned stimulations and/or information relating to these stimulations can also be supplied to a reference device in order to calculate a corresponding reference response. By means of this reference response, the testing of the function of the driver assistance system 10 is carried out as described above in FIG. 1. The stimulation response which is intended to be taken into account in this instance may contain a result of the processing 46, for instance the vehicle influencing 48 which is intended to be carried out. The stimulation response may further contain the electrical signal 44 if the stimulation comprises the environment 40 or the artificial target 42.

If the environment 40 is selected as the stimulation, in order to determine the reference response data relating to a position and/or orientation of the sensor system 38 can be transmitted to a reference device. The reference device can then establish the reference response from the reference responses of other driver assistance systems which were previously transmitted to it for this position and/or orientation. A typical example of this procedure is testing whether, when travelling a specific road in a specific direction, one or more, in particular all, of the traffic signs which are erected there have been correctly identified by the driver assistance system 10.

Figure 3:
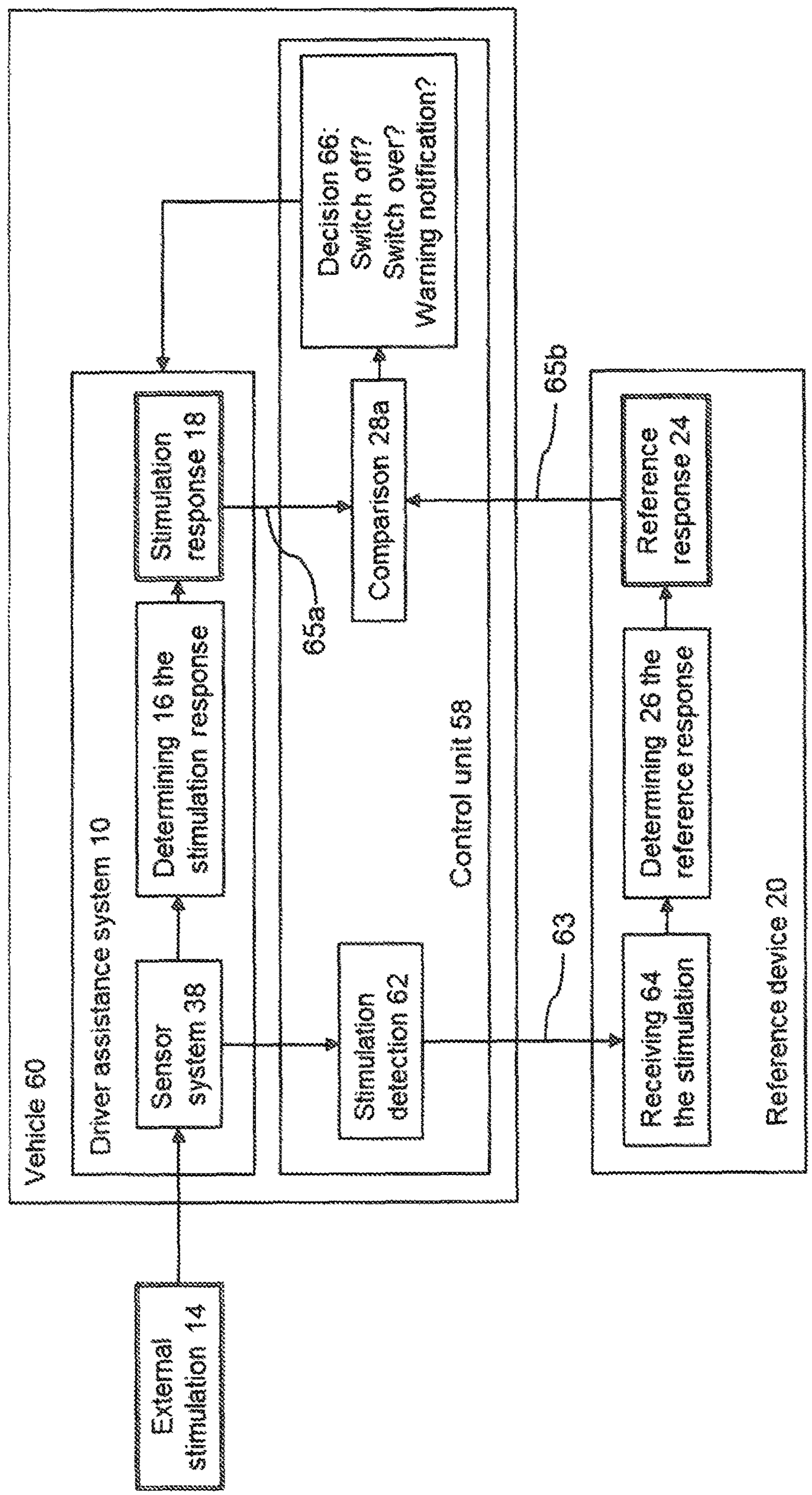
FIG. 3 is a schematic illustration of the implementation of a second variant of the method according to the invention with a control unit according to the invention and a reference device according to the invention, in each case in a first embodiment, wherein the control unit is arranged in a vehicle.

FIG. 3 is a schematic illustration of the implementation of a second variant of the method according to the invention. To this end, a control unit 58 according to the invention and a reference device 20 according to the invention are used, each in a first embodiment. In a control device of a vehicle 60, both the driver assistance system 10 and the control unit 58 are implemented, wherein the control unit 58 is constructed as a control module which is separate from (independent of) the driver assistance system 10.

The method sequence begins with the stimulation of a sensor system 38 of the driver assistance system 10 by an external stimulation 14. In the driver assistance system 10, the stimulation 14 is then processed in order to determine 16 a stimulation response 18. Furthermore, the stimulation 14 is forwarded from the sensor system 38 of the driver assistance system 10 to the control unit 58 where it is detected 62. The control unit 58 transmits 63 the stimulation 14 (for instance, an electrical signal of the sensor system 38) or information which unambiguously describes the stimulation (for instance, position and orientation of the sensor system 38 in a known environment) to the reference device 20. After receiving 64 the stimulation 14 or the information which describes the stimulation 14 from the control unit 58, the reference device 20 determines 26 a reference response 24.

The stimulation response 18 from the driver assistance system 10 and the reference response 14 from the reference device 20 are then transmitted 65*a*, 65*b* to the control unit 58 where they are compared 28*a*. Using the result of the comparison 28*a*, the control unit 58 decides 66 whether the driver assistance system 10 has to be (partially) switched off or switched to a safe state or whether a warning notification should be transmitted.

The sequence of the method according to the invention illustrated in FIG. 3 can be used to test the function of the driver assistance system 10 during a journey of the vehicle 60. In addition to the driver assistance system 10 in the illustrated method variant, the control unit 58 is also configured in the vehicle 60. The reference device 20 is in contrast located outside the vehicle 60; it may in particular be configured in a central server or a cloud platform.

Figure 4:
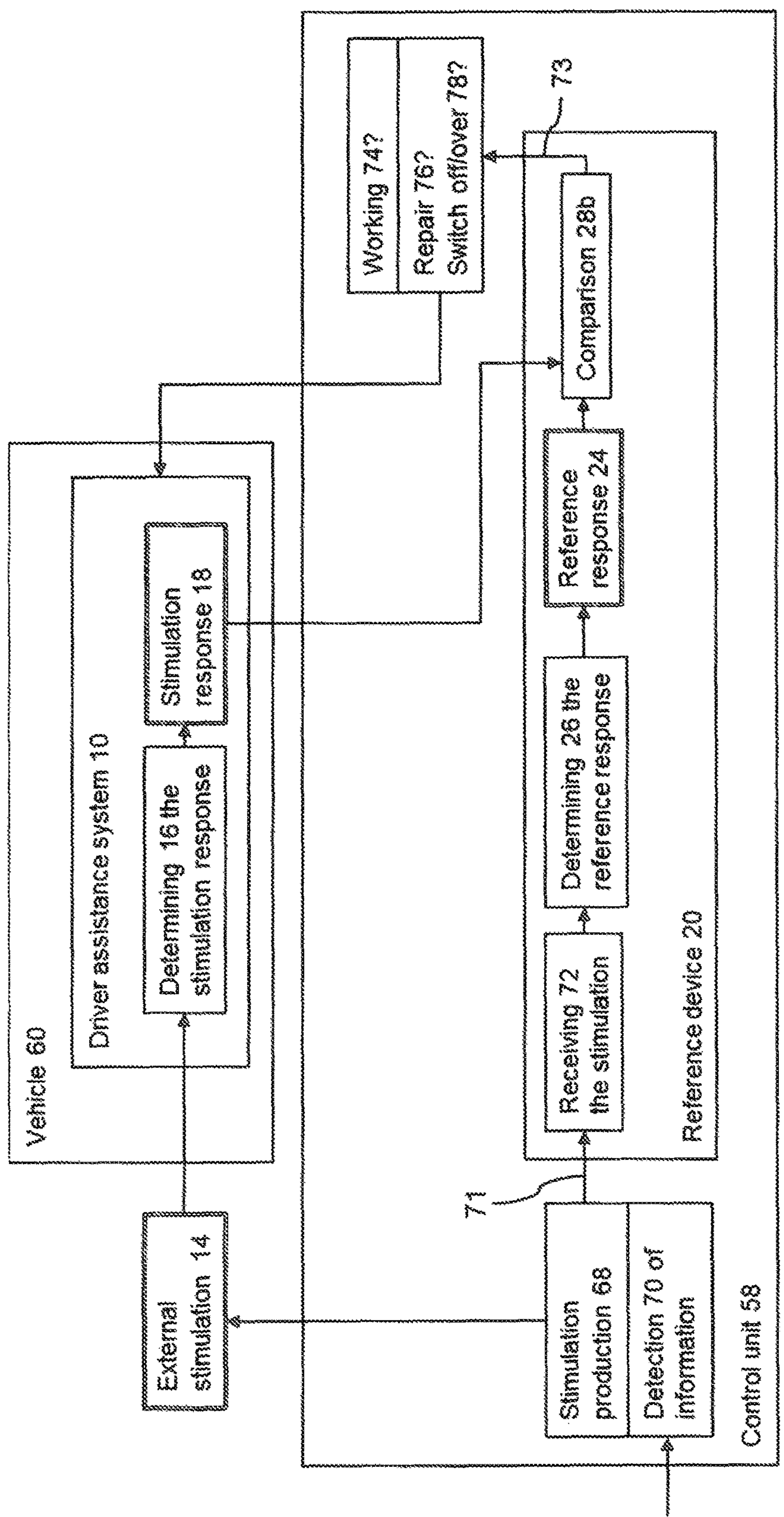
FIG. 4 is a schematic illustration of the implementation of a third variant of the method according to the invention with a control unit according to the invention and a reference device according to the invention, in each case in a second embodiment, wherein the reference device is part of the control unit.

FIG. 4 schematically illustrates the implementation of a third variant of the method according to the invention for testing the function of a driver assistance system 10 of a vehicle 60. Outside the vehicle 60 and independently of the vehicle 60 and the driver assistance system 10 thereof, a control unit 58 is used with an integrated reference device 20 in order to implement the method. The variant illustrated may be used, for example, when testing the function of the driver assistance system 10 in the context of a workshop inspection or a main inspection. The control unit 58 with the reference device 20 may, for example, be provided in a or as a diagnostic device.

An external stimulation 14 is in this instance produced 68 by the control unit 58 after the control unit 58 has detected 70 information relating to the stimulation 14 which has been entered by an operator (not illustrated). From the stimulation 14, a stimulation response 18 is then determined 16 in the driver assistance system 10. In addition, the stimulation 14 or information relating to the stimulation 14 is then transmitted 71 from the control unit 58 to the reference device 20 and received 72 thereby. The reference device 20 subsequently determines 26 a reference response 24. Furthermore, the reference device 20 receives the stimulation response 18 from the driver assistance system 10. To this end, a wired communication connection and a diagnostic port of the vehicle 60 may, for example, be used.

The reference device 20 then compares 28*b* the stimulation response 18 with the reference response 24. The result of the comparison 28*b* is transmitted 73 from the reference device 20 to the control unit 58, where it is decided using the comparison result whether the driver assistance system 10 is still functioning 74 as specified, whether it should be repaired or replaced 76 or whether in the event of a repair/replacement not being carried out a (partial) switching off and/or switching over to a safe state is required 78. Corresponding information can be transmitted from the control unit 58 to the operator and/or stored in an error memory of the vehicle 60.

Figure 5A:
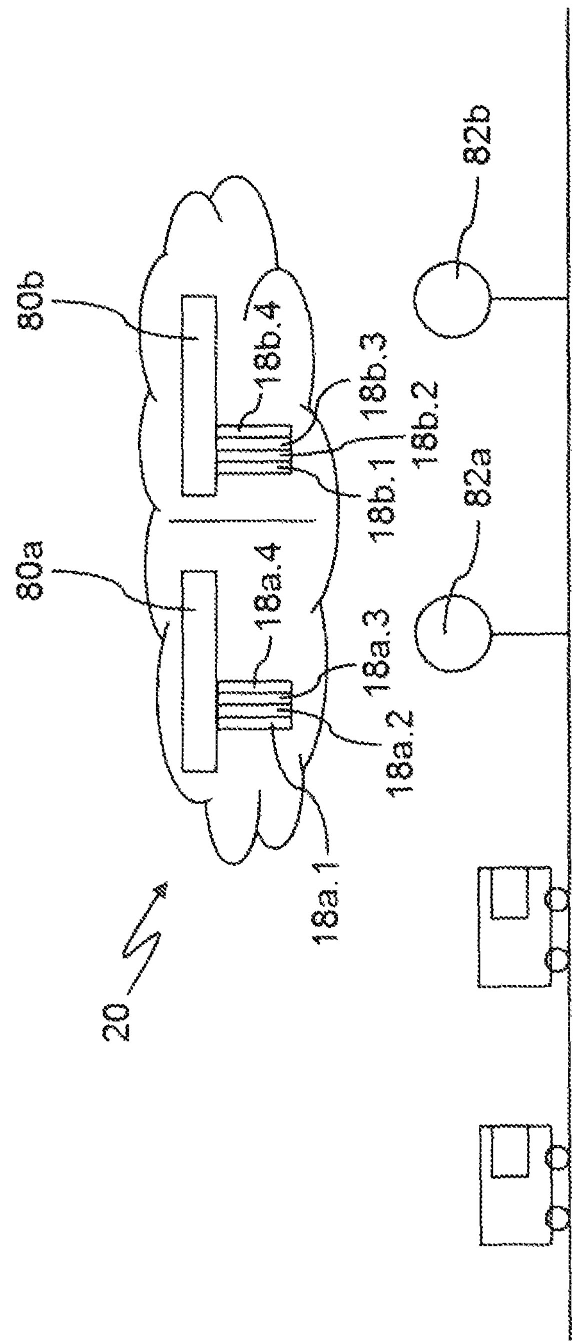
FIGS. 5*a*, 5*b* and 5*c* are schematic illustrations of the sequence of a fourth variant of the method according to the invention, wherein a reference device is constructed as a cloud platform.
Figure 5B:
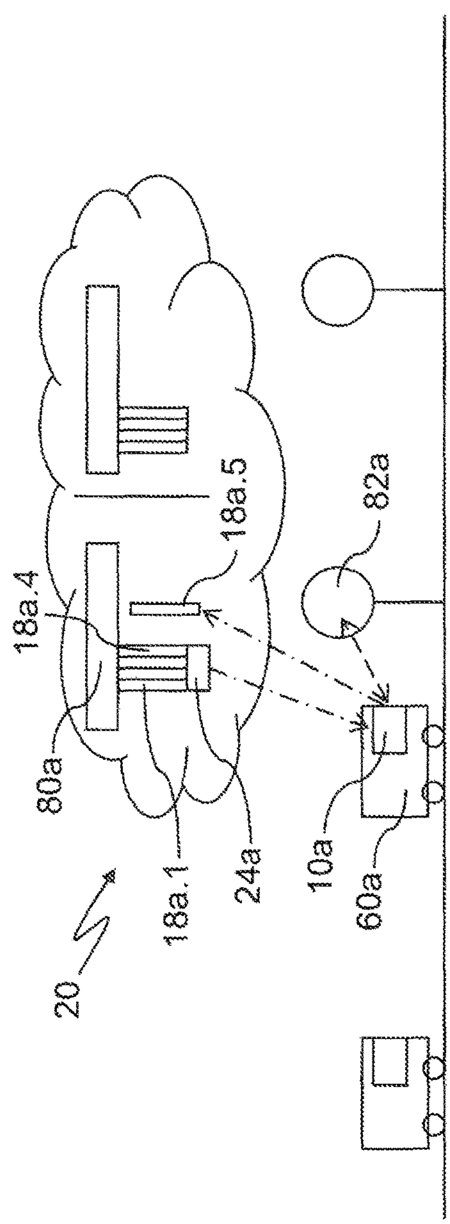
Figure 5C:
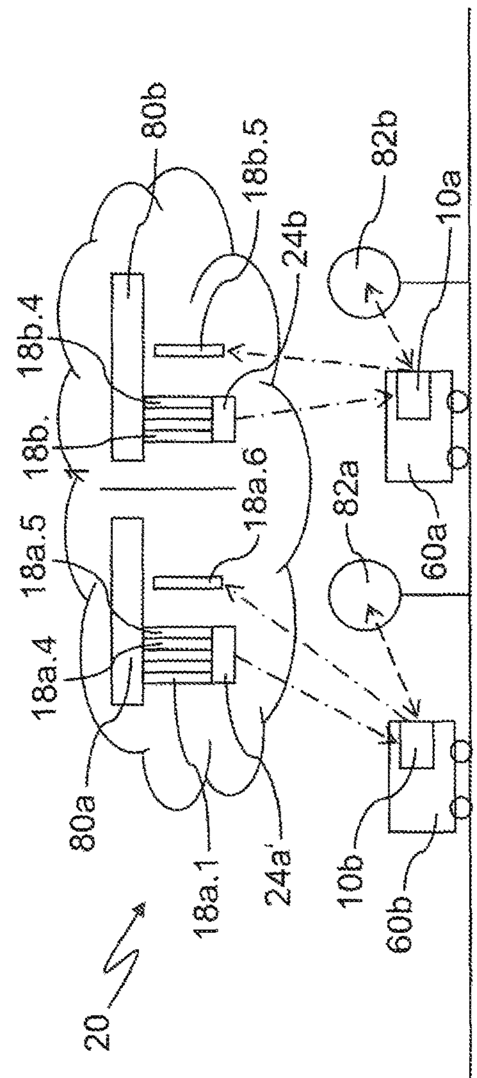

In FIGS. 5*a*, 5*b* and 5*c*, the sequence of a fourth variant of a method according to the invention is schematically illustrated. A reference device 20 is constructed in this instance as a cloud platform (cloud database).

In the state according to FIG. 5*a*, information 80*a*, 80*b* relating to a plurality of external stimulations and a plurality of associated stimulation responses 18*a*.1-18*a*.4, 18*b*.1-18*b*.4 are stored in the reference device 20. The external stimulations are in this instance the manifestations of an environment including local traffic influencing means, such as traffic signs 82*a*, 82*b* or traffic lights. The information 80*a*, 80*b* comprises, for example, position and orientation of sensor systems of vehicles, which can perceive the corresponding stimulation; this information 80*a*, 80*b* also corresponds to a location of the traffic signs 82*a*, 82*b* and the orientation thereof in relation to a travel direction. The stimulation responses 18*a*.1-18*a*.4, 18*b*.1-18*b*.4 were previously transmitted from vehicles with driver assistance systems to the reference device 20. It should be noted that generally not only a few, but instead at least after some time, typically several thousand stimulation responses are stored in the reference device 20.

FIG. 5*b* illustrates how a first vehicle 60*a* with a driver assistance system 10*a* drives past the first traffic sign 82*a*. The driver assistance system 10*a* of the first vehicle 60*a* detects as an external stimulation the manifestation of the traffic sign 82*a* with a camera system. From the stimulation detected, the driver assistance system 10*a* calculates a stimulation response 18*a*.5 which in this instance refers to the type of traffic sign 82*a* (for example, "No Overtaking"). The stimulation response 18*a*.5 is transmitted together with information 80*a* relating to the position and orientation of the sensor system (in this instance, the camera system) of the vehicle 60*a* to the reference device 20. Furthermore, the vehicle 60*a* receives from the reference device 20 a reference response 24*a*. The reference response 24*a* is in this instance an item of information established using statistical methods from the stimulation responses 18*a*.1-18*a*.4 relating to the type of traffic sign 82*a*. Using the reference response 24*a*, a control module which is implemented in the driver assistance system 10*a* can test as a control unit (not illustrated in greater detail) the functionality of the driver assistance system 10*a*.

In the state according to FIG. 5*c*, the vehicle 60*a* has arrived at the traffic sign 82*b* so that the manifestation thereof is detected by the driver assistance system 10*a*. A stimulation response 18*b*.5 calculated by the driver assistance system 10*a* is transmitted with the corresponding position and orientation to the reference device 20. The reference device 20 transmits in return a reference response 24*b* determined from the older stimulation responses 18*b*.1-18*b*.4 to the control module for the driver assistance system 10*a*.

According to FIG. 5*c*, a second vehicle 60*b* is further driven up to the traffic sign 82*a*. A driver assistance system 10*b* of the vehicle 60*b* detects the manifestation of the traffic sign 82*a*, determines a stimulation response 18*a*.6 and transmits the stimulation response 18*a*.6 to the reference device 20. The stimulation response 18*a*.5 previously transmitted from the first vehicle 60*a* was added in the reference device 20 to the database for the location and the orientation (information 80*a*) of the traffic sign 82*a* so that the database now comprises the stimulation responses 18*a*.1-18*a*.5. From the stimulation responses 18*a*.1-18*a*.5, the reference device 20 establishes a new reference response 24*a*'. The reference response 24*a*' is based in comparison with the reference response 24*a* used in accordance with FIG. 5*b* on the expanded database with the additional stimulation response 18*a*.5 so that the reference response 24*a*' can be considered to be more stable (better verified). Using the reference response 24*a*', the functionality of the driver assistance system 10*b* can then be assessed.

What is claimed is:

1. A method for testing the function of a driver assistance system of a vehicle, wherein an environment of the vehicle is detected by means of a sensor system, the method comprising the steps of:

a) stimulating the driver assistance system by means of an external stimulation;

b) processing the external stimulation in the driver assistance system so that a stimulation response is obtained;

c) transmitting the external stimulation and/or information relating to the external stimulation to an external reference device and determining a reference response for the stimulation in the external reference device in accordance with a desired state of the driver assistance system; and d) comparing the stimulation response with the reference response.

2. The method according to claim 1, wherein in step a) the external stimulation is an electrical signal which is produced by the sensor system, wherein in step c) the electrical signal produced is transmitted to the external reference device and in the external reference device the reference response is calculated from the electrical signal.

3. The method according to claim 1, wherein in step a) the external stimulation is the manifestation of the environment of the sensor system, wherein in step c) information relating to a position and/or an orientation of the sensor system is transmitted to the external reference device, and wherein in step c) the external reference device determines from stimulation responses transmitted from the driver assistance systems of other vehicles a reference response with respect to this position and/or this orientation of the sensor system thereof.

4. The method according to claim 1, wherein the method is used at least when the vehicle is travelling.

5. The method according to claim 1, wherein the method is at least also executed during a workshop inspection of the vehicle.

6. The method according to claim 1, wherein the method is also carried out at least after the vehicle has been parked after a journey.

7. The method according to claim 1, further including a step e) wherein the driver assistance system is at least partially switched off and/or switched over into a safe state if from the comparison pursuant to the step d) a safety-relevant malfunction of the driver assistance system is established.

8. The method according to claim 7, wherein a malfunction is identified by the stimulation response being located outside absolute tolerances with respect to the external reference response.

9. The method according to claim 8, wherein an imminent malfunction is identified by the stimulation response being located outside age-related permissible tolerances with respect to the reference response, even when the stimulation response is still located within the absolute tolerances and by a warning notification being output when an imminent malfunction is identified.

10. The method according to claim 1, wherein in step c) a mobile communications and/or internet connection is used between the driver assistance system and the reference device.

11. The method according to claim 1, wherein the external stimulation is from an environment, an artificial target, a generic signal, a vehicle sensor data or a virtual vehicle behavior.

12. The method according to claim 11, wherein the environment comprises a road, a road marking, a traffic sign, other road users, a delimitation post, a wall, a fence, an animal, a bush and/or a tree.

13. The method according to claim 11, wherein the artificial target comprises a chequered face, a projection on a screen, a traffic sign and/or a projection directly to the driver assistance system.

14. The method according to claim 1, wherein the external reference device is a secondary driver assistance system of a secondary vehicle that has travelled along a same path as the vehicle of the driver assistance system, or wherein the external reference device is provided with the external stimulation or information relating to the external stimulation from a control unit located on the vehicle and constructed as a control module separate from the driver assistance system.

15. A control unit for a driver assistance system of a vehicle for testing the function of the driver assistance system, the control unit comprising:

a means for detecting an external stimulation and/or information relating to the external stimulation, which stimulates the driver assistance system;

a means for detecting a stimulation response of the driver assistance system to the external stimulation;

a means for transmitting the external stimulation and/or the information relating to the external stimulation to an external reference device; and a means for an at least partial switching-off and/or switching-over to a safe state of the driver assistance system if a safety-relevant malfunction of the driver assistance system is present.

16. The control unit according to claim 15, wherein the control unit further comprises:

a means for detecting a reference response which is transmitted from the external reference device; and a means for comparing the stimulation response with the reference response.

17. The control unit according to claim 15, wherein the means for detecting the external stimulation comprises a camera, an ultrasound, a radar and/or a LIDAR sensor.

18. A reference device for a driver assistance system of a vehicle for testing the function of the driver assistance system, the reference device comprising:

a means for receiving an external stimulation and/or information relating to the external stimulation which stimulates the driver assistance system from a control unit for the driver assistance system; and a means for determining a reference response to the stimulation, in accordance with a desired state of the driver assistance system.

19. The reference device according to claim 18, wherein the reference device further comprises a means for transmitting the reference response to the control unit.

20. The reference device according to claim 18, wherein the reference device further comprises:

a means for receiving a stimulation response of the driver assistance system from the control unit;

a means for comparing the stimulation response with the reference response; and a means for transmitting the comparison result or switch-off and/or switch-over instructions for the driver assistance system to the control unit.

* * * * *